United States Patent
Baldwin et al.

(10) Patent No.: US 6,595,646 B2
(45) Date of Patent: Jul. 22, 2003

(54) LOW PROFILE OVERHEAD PROJECTOR HAVING A FOLDABLE POST

(75) Inventors: Dwight G. Baldwin, Austin, TX (US); James E. Peterson, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/100,311

(22) Filed: Mar. 18, 2002

(65) Prior Publication Data

US 2002/0176057 A1 Nov. 28, 2002

Related U.S. Application Data

(60) Provisional application No. 60/277,390, filed on Mar. 19, 2001.

(51) Int. Cl.[7] .............................................. G03B 21/00
(52) U.S. Cl. ...................... 353/63; 353/119; 353/DIG. 3
(58) Field of Search .............................. 353/63, 64, 65, 353/66, DIG. 3, 119, 101, DIG. 4

(56) References Cited

U.S. PATENT DOCUMENTS

| | | | | |
|---|---|---|---|---|
| 4,795,252 A | * | 1/1989 | Kyhl | 353/122 |
| 4,944,586 A | * | 7/1990 | Rightmyre | 353/108 |
| 4,969,733 A | | 11/1990 | Jewison | |
| 5,281,986 A | * | 1/1994 | Anton | 353/63 |
| 5,382,991 A | * | 1/1995 | Rodriguez, Jr. et al. | 353/119 |
| 5,428,416 A | * | 6/1995 | Rodriquez, Jr. et al. | 353/119 |
| 5,826,962 A | * | 10/1998 | Rodriguez, Jr. | 353/82 |
| 6,170,954 B1 | * | 1/2001 | Kai et al. | 353/101 |

FOREIGN PATENT DOCUMENTS

DE   195 38 795 A   4/1997

OTHER PUBLICATIONS

PCT Search Report PCT/US02/08372 mailed Jul. 29, 2002.

* cited by examiner

*Primary Examiner*—William Dowling
(74) *Attorney, Agent, or Firm*—Yen Tong Florczak

(57) ABSTRACT

The present invention provides overhead having (a) a main body having a stage area, (b) a head assembly, and (c) a post suspending the inverted head assembly over the stage area. The post is pivotally attached to the main body in accordance with equation $$\text{Clearance} = \sqrt{(Mx-Px)^2+(My-Py)^2} - \sqrt{(Fx-Px)^2+(Fy-Py)^2}$$

and the post is outside the stage area. In a preferred embodiment, the head assembly is an inverted head assembly.

2 Claims, 6 Drawing Sheets

LOW PROFILE OVERHEAD PROJECTOR HAVING A FOLDABLE POST

RELATED APPLICATIONS

The present application claims priority from U.S. Provisional Application No. 60/277,390, filed on Mar. 19, 2001. The present application is also related to co-pending, commonly assigned U.S. application Ser. No. 09/811,936, entitled "Projector Having an Inverted Head Optical Arrangement" which was filed on Mar. 19, 2001 and which is hereby incorporated by reference in its entirety.

TECHNICAL FIELD

The present invention relates to an overhead projector having a reduced height placement of an inverted projection head. In particular, the overhead projector of the present invention includes a post folding mechanism that allows for ease of storage when the projector is not being used, while reducing the possible damage to optical components.

BACKGROUND

Figure 1:
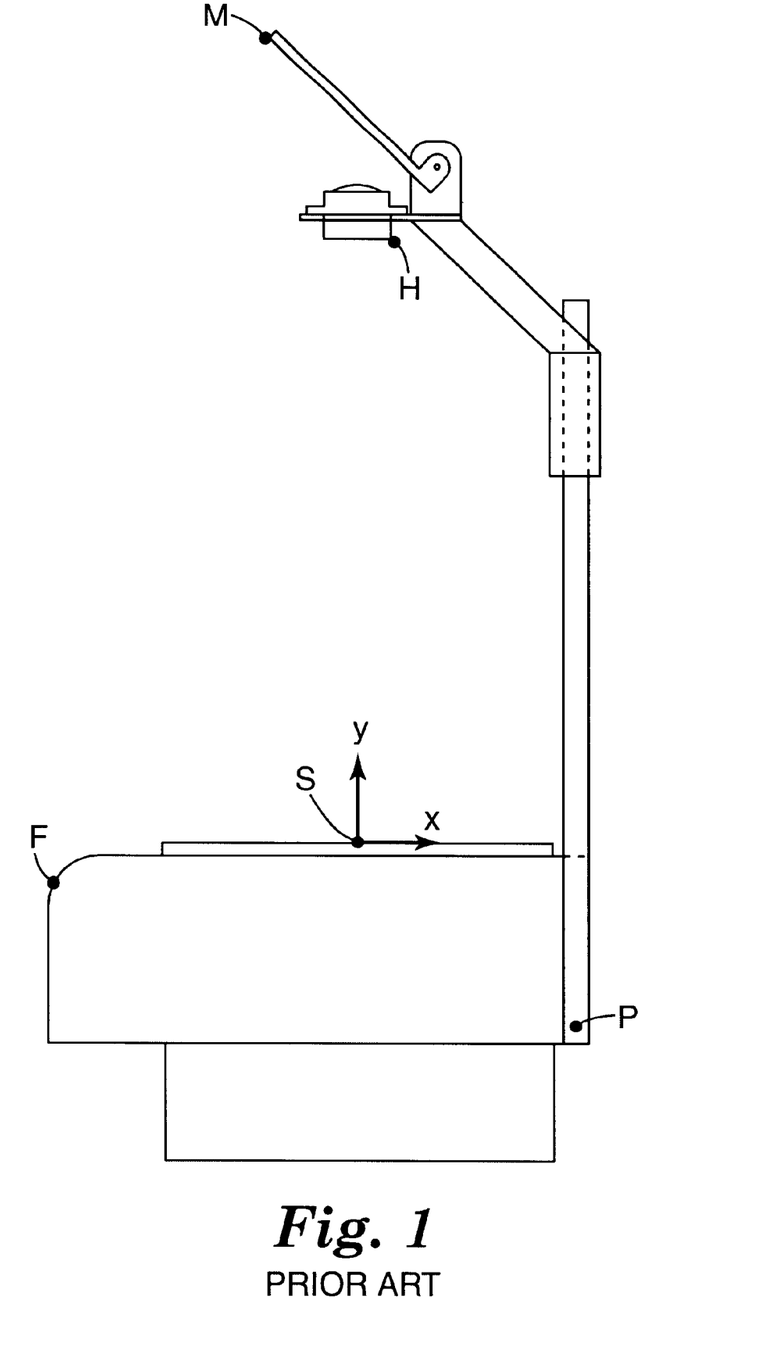
FIG. 1 is a side elevation view of a conventional overhead projector.

One type of conventional overhead projector ("OHP") uses a Cooke Triplet projection lens where light passes from a light source through a Fresnel lens below a stage on which a transparent object containing the image to be projected is located. After the light passes through the transparent object, the light passes through the Cooke Triplet projection lens and then is reflected off a folding mirror toward a projection screen. To obtain good image quality, the light from the projection lamp focuses at a stop position in or near the Cooke Triplet projection lens. FIG. 1 shows a conventional OHP having a light source, a main body having a horizontal light transmissive stage, and a projection head assembly suspended above the stage by a post. The head assembly includes the Cooke Triplet projection lens and the folding mirror. In traditional OHPs, the post is pivotally attached to the main body, to allow the head assembly and the post to be folded along the side of the main body for storage or lowering of the profile when not in use. Normally, the height dimension of the head assembly above the stage is larger than the length of the main body, and the head assembly clears the front of the machine easily with room to spare.

As described in the above-mentioned related application "Projector Having an Inverted Head Optical Arrangement," a new optical design allows the projection head assembly to be placed closer to the stage. In an OHP having a traditional pivoting post, a lower positioned head assembly may not clear the main body. Accordingly, a user may not be able to fold the system completely without repositioning the head assembly, resulting in the head assembly colliding with the stage. Repositioning the head assembly every time the post is folded requires added handling and results in changing the focus of the OHP. Failure for the head assembly to clear the stage may damage the optical components.

A need exists for other types of low-profile OHP having the ability to fold easily and safely when not in use.

SUMMARY

The present invention relates to an improved overhead projector having a reduced height placement of an inverted head assembly and providing clearance such that the inverted head assembly may be pivotally rotated between a storage position and a display position. When the inverted head is in the storage position, the overhead projector is in the storage mode. When the inverted head is in the display position, the overhead projector is capable of being in the display mode.

In brief summary, in one embodiment, the inventive overhead projector comprises (a) a main body having a stage area, (b) an inverted head assembly, and (c) a post suspending the inverted head assembly over the stage area. The post is pivotally attached to the main body in accordance with equation $$\text{Clearance} = \sqrt{(Mx-Px)^2+(My-Py)^2} - \sqrt{(Fx-Px)^2+(Fy-Py)^2}$$

and the post is outside the stage area when the OHP is in a display mode.

The main body of the overhead projector includes a light transmissive stage having some type of condenser technology, e.g., a Fresnel-condensing lens or an image reflector, positioned underneath. The light transmissive stage defines the stage area of the overhead projector.

In contrast to conventional projectors, the present invention, in one embodiment, uses an inverted head assembly. In an inverted head assembly, the projection lens is positioned such that after light passes through the transparent object, the light reflects off a folding mirror and then passes through the projection lens towards the projection screen. The mirror folds the light path allowing the inverted head assembly, which includes the folding mirror and the projection lens, to be positioned closer to the stage than a non-inverted head assembly.

A post holds the inverted head assembly over the stage area. The post has connected at one end the inverted head assembly and at the other end is pivotally connected to the main body. When the inverted head assembly is positioned upright so as to be over the stage area, the projector is in an image display position and the post is positioned at one corner of the stage area. When the inverted head assembly is rotated to a position in front of the stage area, the projector is in a storage position. One of the advantages of the present invention is that in that when the inverted head assembly is in the display position and focused, a user does not need to refocus the inverted head assembly when changing from the initial display position to the storage position and back to the display position. Thus, the user does not need to change the inverted head assembly position, e.g., by moving it upward away from the stage area, in order to store the OHP.

In a preferred embodiment, the post has a curved end portion. Illustrative end portions include those that are substantially in an "L" or "S" shape. One skilled in the art will appreciate that other cured portions designs can be used. Such post designs provide the advantages of reduced height placement of the inverted head assembly, clearance such that the inverted head assembly may be pivotally rotated between a storage position and an image display position, and positioning the post outside the stage area, such as at the corner of the stage, so as to provide unobstructed access to the stage area. The curved end portion can be an integral part of the post or it can be an attachment to the post.

Unobstructed access to the stage area is desirable because it allows for easy interchange of display media. For example, a roller attachment can be used, if desired, allowing a presenter to refresh the projected image surface by rotating new media across the stage area.

The overhead projector of the present invention includes a post folding mechanism that creates a reduced height placement of an inverted head assembly and provides clearance such that the projector assembly may be pivotally rotated between a storage position and an image display position.

BRIEF DESCRIPTION OF THE DRAWINGS

The invention can be better described with the following figures wherein.

These figures are idealized, not drawn to scale, intended only for illustrative purposes, and are non-limiting.

DETAILED DESCRIPTION OF THE INVENTION

Figure 2:
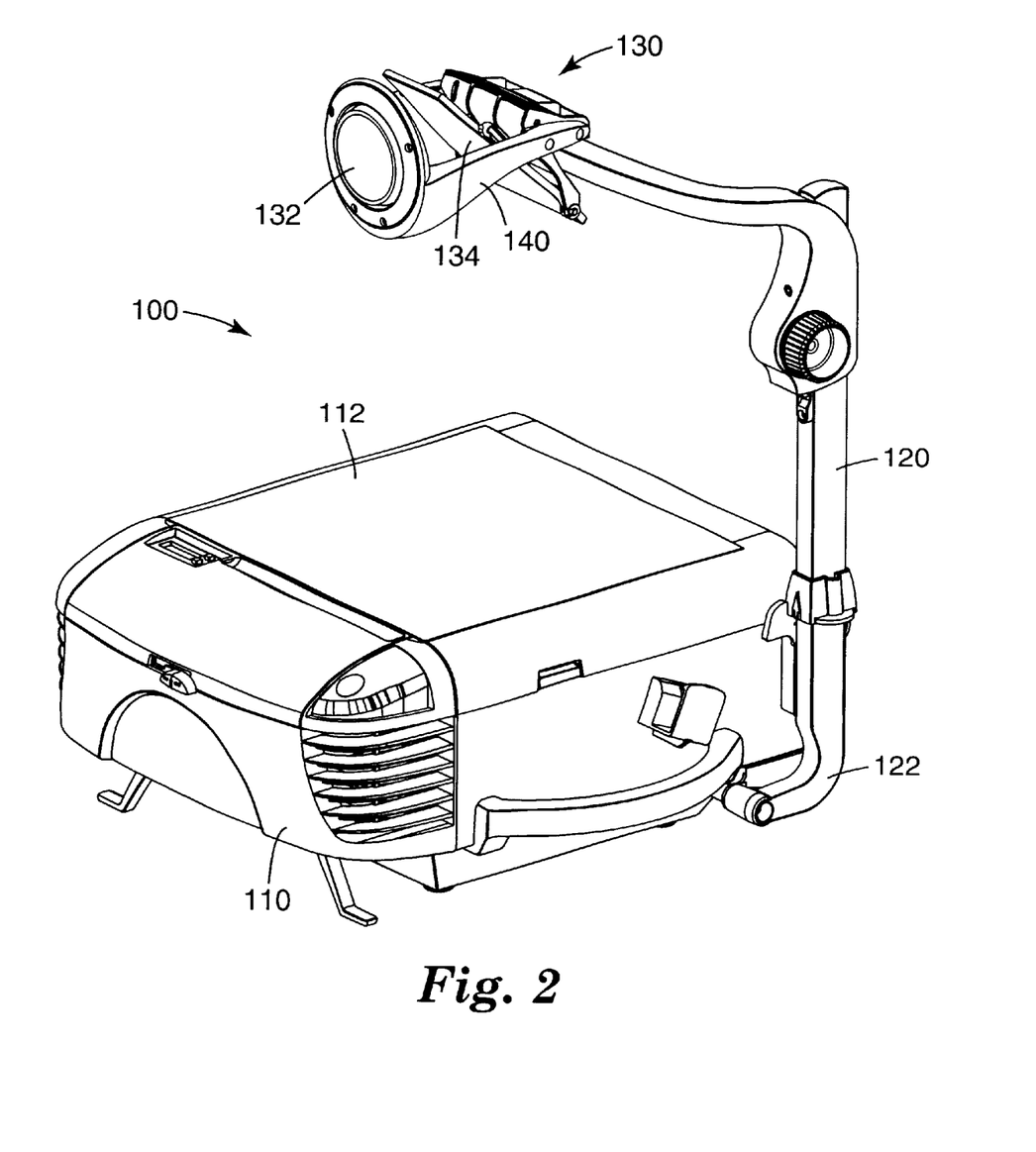
FIG. 2 is an isometric view of an overhead projector in accordance with the present invention.
Figure 3:
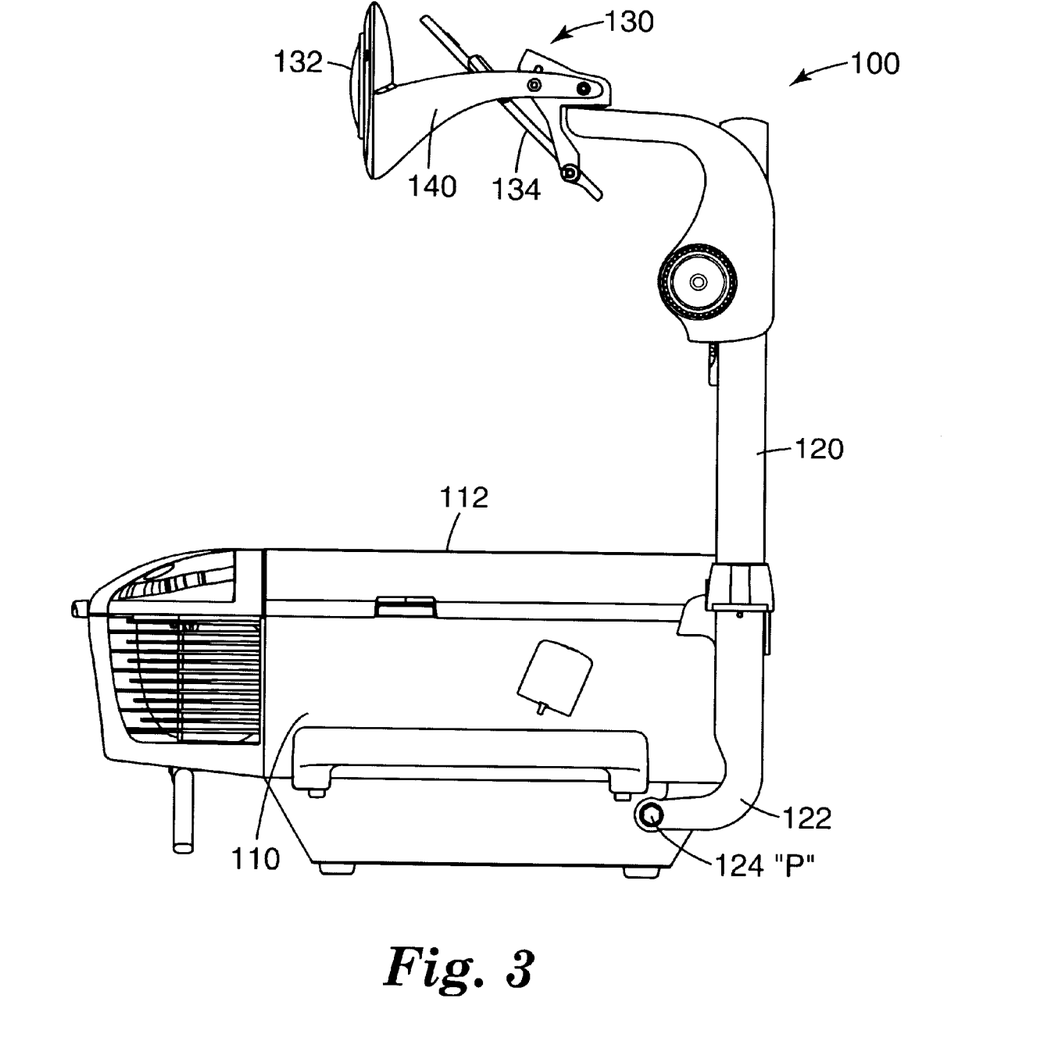
FIG. 3 is a side elevation view of the Overhead Projection of FIG. 2.
Figure 4:
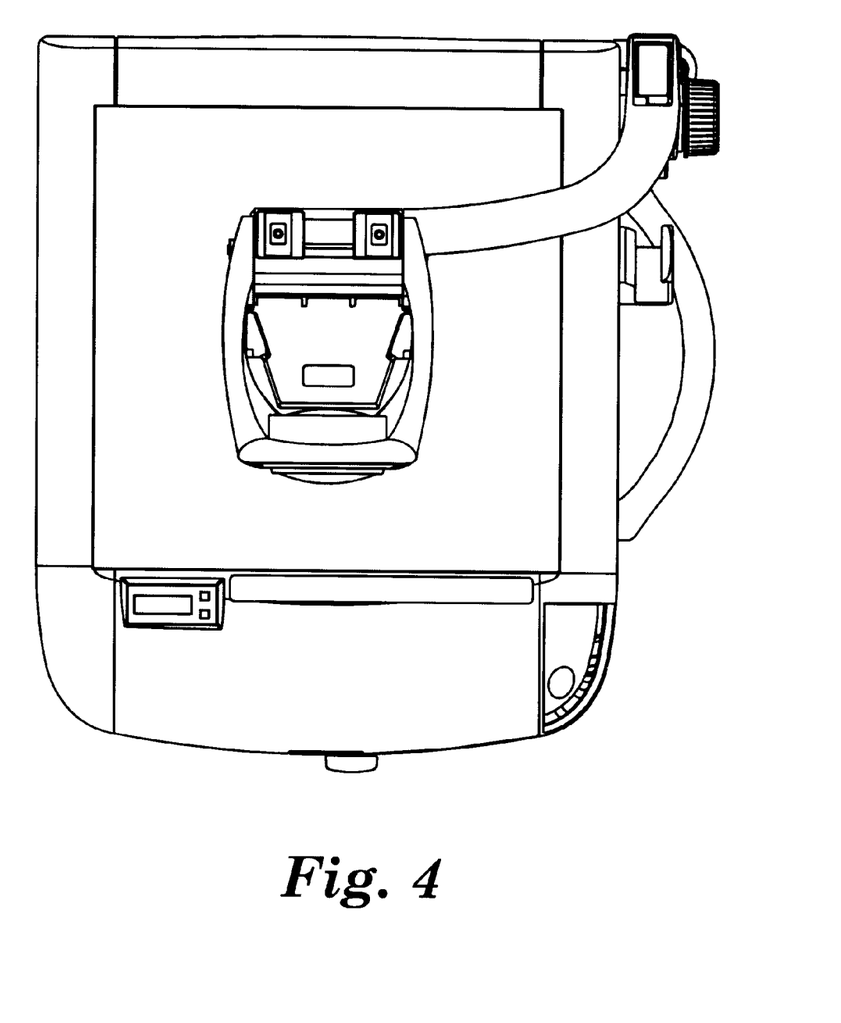
FIG. 4 is a top plan view of the Overhead Projector of FIG. 2.

FIGS. 2 to 4 illustrate an OHP 100 in accordance with the present invention. Projector 100 includes main body 110, head assembly support arm or post 120, and head assembly 130. The main body includes transmissive stage 112 having a Fresnel condensing lens positioned underneath. Inside the main body resides a light source (not shown). Post 120 suspends head assembly 130 over stage 112. Head assembly 130 includes lens 132 and mirror 134. In a preferred embodiment, head assembly 130 is an inverted head assembly.

The head assembly of the OHP of the present invention is about 5 inches (13 cm) lower (closer to the stage) than that of a conventional OHP. If, as in conventional OHPs, a straight post was attached to the main body using a simple pivot, the head assembly of the present invention would likely collide with the front of machine when the head assembly is folded down to the storage position unless the head assembly was first moved upward away from the stage. Moving the head assembly of the present invention to a position to allow for clearing the stage is undesirable because it defocuses the system.

Figure 5:
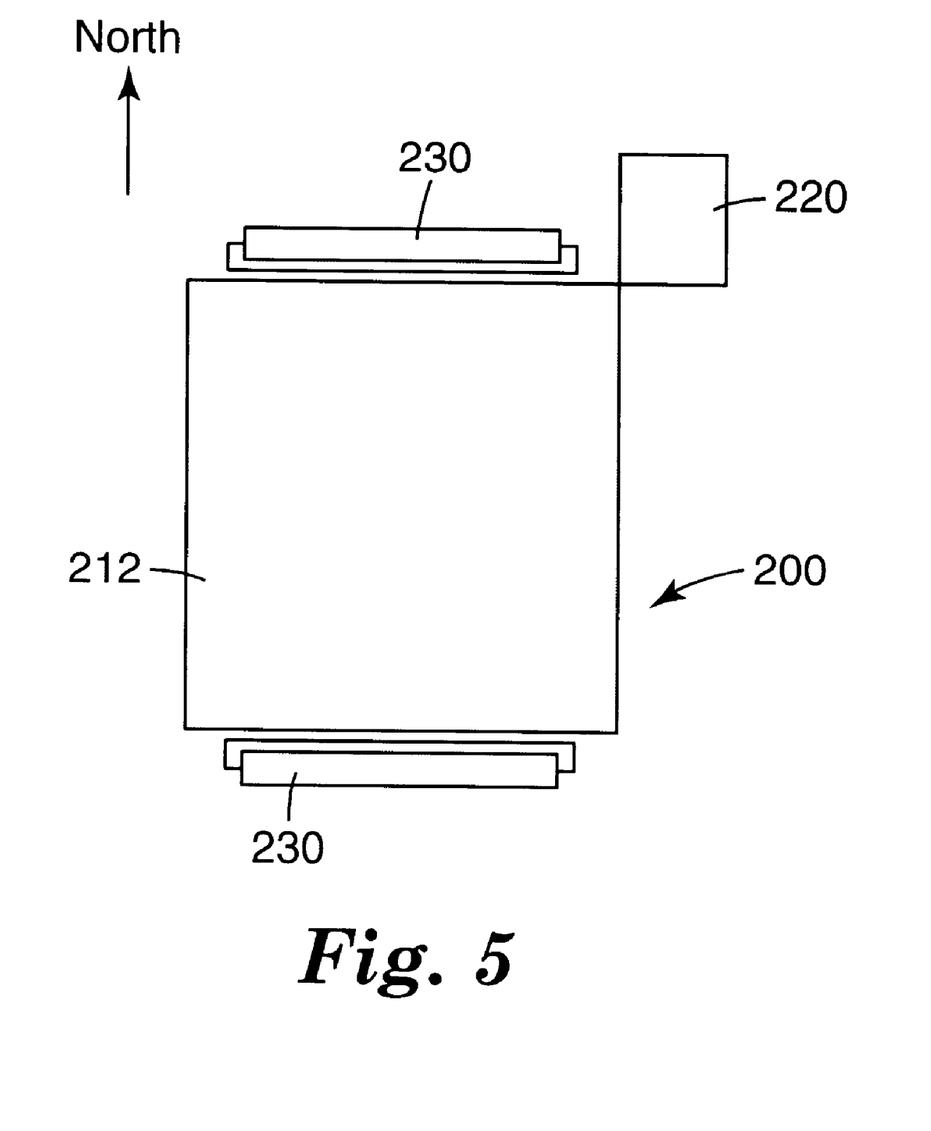
FIG. 5 is a schematic top plan view of a second overhead projector in accordance with the present invention and showing one embodiment of a roller attachment position.

FIG. 5 illustrates a schematic plan view of an alternative embodiment of OHP 200 in accordance with the present invention having roller attachments 230. The OHP 200 has stage area 212 and post 220. In some applications, it is desirable for the overhead projector to have roller attachments so as to allow for a continuous source of presentation materials. Because of the roller attachment requirements, post 220 is positioned at the corner of the main body, outside the stage area. This corner placement further increases the distance necessary for the head assembly (not shown) to clear the stage. And, because the roller material may go either "north-south," or "east-west," it is desired that post 220 does not interfere with either the side or top of stage area 212 in the display or storage positions. When used, the roller attachments can be mounted, e.g., with fastening means such as screws, directly on the main body. One skilled in the art will recognize that other fastening means can be used.

As may be appreciated in more detail in FIGS. 2 and 3, post 120 of the present invention is not a straight member. Instead, post 120 includes curved end portion 122. Post 120 is attached to main body 110 at pivot point P 124 that is laterally displaced from the north edge of the main body.

Figure 6:
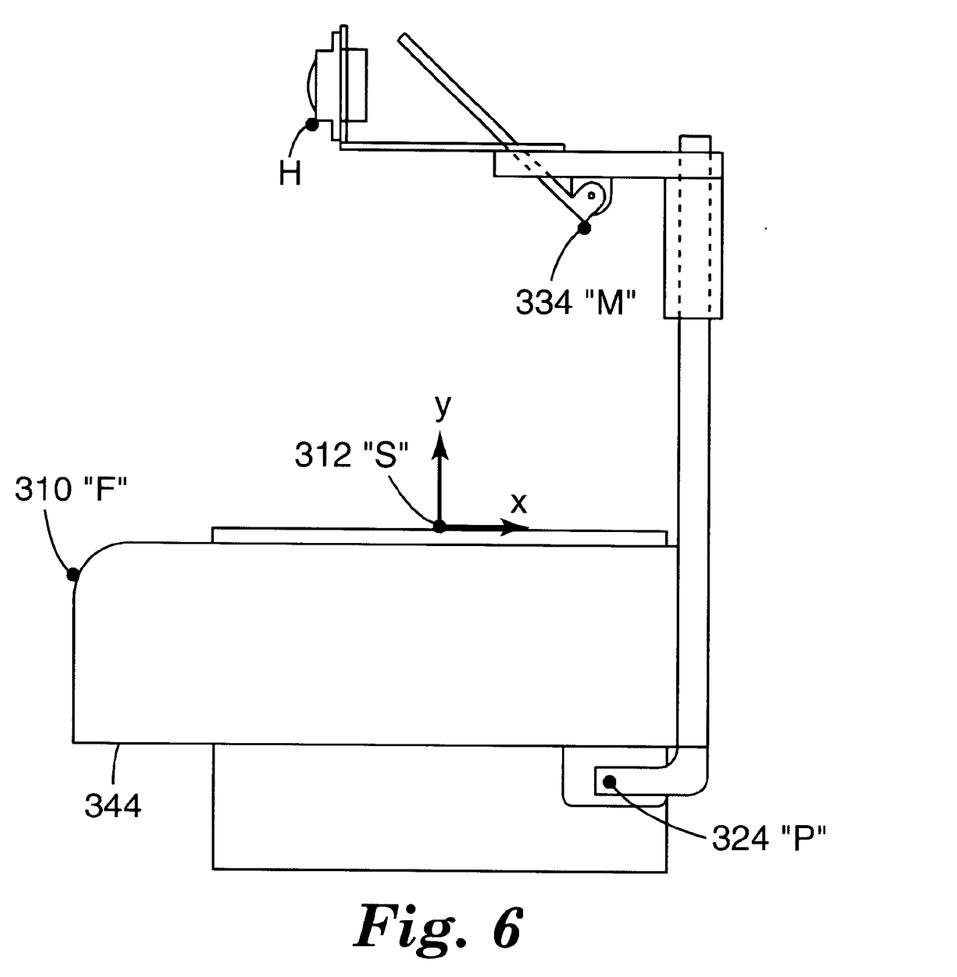
FIG. 6 is a schematic side view of an overhead projector in accordance with the present invention.

FIG. 6 better illustrates the position of the several reference points for the inverted head OHP such as post pivot point (P) 324, the point where the inverted head mirror (M) is closest to the stage area 334, a reference point (S) on the stage area 312, and a point on the front (F) of the OHP main body 310. When compared to FIG. 1, FIG. 6 shows the position of head assembly 130 to be closer to stage area S. In a preferred embodiment, the post is positioned at the north-east corner of the main body and the front of the overhead projector is the south face.

An equation has been developed to determine the position of the post pivot P. The furthermost point to P on the front of the OHP body is F, the body collision point. The closet point to P on the inverted projector head is M, the mirror collision point. The condition that must be met in order for the projector head to clear the front of the OHP body is that the distance from M to P must be greater than the distance from F to P, as described in the following equation:

$$\text{Clearance} = \sqrt{(Mx-Px)^2+(My-Py)^2} - \sqrt{(Fx-Px)^2+(Fy-Py)^2} \quad (1)$$

The coordinate system can be centered at any point. A suggested point is S. The clearance is the minimum allowed distance between M and F during the folding process.

Equation 1 has two unknowns: Px and Py. The x and y indicate a Cartesian coordinate system. It is expected that other design constraints will create additional relationships between Px and Py allowing equation 1 to be solved. If not then there is a locus of points that all satisfy equation 1. Any of these points may be used.

As an example, if a projector screen size having a width of 100" is selected, and design values for S, M, H and F, are as shown in Table 1, then the locus of pivot points P, that satisfy equation 1, with clearance values of 0.0, 0.25 and 0.50 inches, are shown in

TABLE 1

|            | inches      | inches      |
|------------|-------------|-------------|
| S (origin) | Sx = 0.0    | Sy = 0.0    |
| M (mirror) | Mx = 2.95   | My = 9.39   |
| H (head)   | Hx = −2.96  | Hy = 9.82   |
| F (front)  | Fx = −10.7  | Fy = −1.85  |

TABLE 2

| | Py (in inches) for a Clearance 0.0, 0.25, and 0.50 | | |
|---|---|---|---|
| Px (inches) | 0.0 | 0.25 | 0.50 |
| 2   | −3.36 | −3.65 | −3.95 |
| 2.5 | −3.97 | −4.27 | −4.58 |
| 3   | −4.58 | −4.89 | −5.24 |
| 3.5 | −5.18 | −5.51 | −5.85 |
| 4   | −5.79 | −6.13 | −6.49 |
| 4.5 | −6.40 | −6.76 | −7.12 |
| 5   | −7.00 | −7.38 | −7.76 |
| 5.5 | −7.61 | −8.00 | −8.40 |
| 6   | −8.22 | −8.62 | −9.04 |
| 6.5 | −8.83 | −9.24 | −9.68 |
| 7   | −9.43 | −9.87 | −10.3 |

Any point P that has a clearance greater than zero would provide clearance for the inverted head assembly to clear the main body. It is desirable to keep the clearance small, so that the overall length of the system in the folded position is at its most compact.

In the preferred embodiment of the invention, the main body has ledge 344 below the stage area and the pivot point is positioned below the ledge, as shown in FIG. 6. This condition sets the Py value at −6.81 inches. In reviewing the data of Table 2 above, a clearance of greater than 0 inches (i.e., a clearance of 0.29 inches) occurs at Px=4.5 inches.

By moving the post pivot point using an L extension in accordance to the above equation, the folded position of the projector head could be controlled. This allows the inverted head assembly to fold into the storage position without colliding with the stage or the front of the OHP. Advantageously, this approach can also be used to improve the design of a conventional OHP, shown in FIG. 1. Using this approach it is possible to reduce the clearance of the projection head in the folded or storage position. When a conventional OHP projector head assembly is pivotally rotated into a stored position, the head assembly typically extends well beyond the main body. By using equation (1), and by constraining Py to be the same height as in FIG. 1, the post pivot point Px is located to the right of the post position on a conventional OHP. Reversing the "L" shaped post, to extend beyond the projector can access this post-position.

While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An overhead projector comprising:
   a) a main body having a stage area;
   b) a inverted head assembly; and
   c) a post suspending the inverted head assembly over the stage, wherein the post is pivotally attached to the main body in accordance with equation $$\text{Clearance} = \sqrt{(Mx-Px)^2+(My-Py)^2} - \sqrt{(Fx-Px)^2+(Fy-Py)^2}$$

wherein the post is outside the stage area when the projector is in a display mode, wherein the post is positioned at the corner of the stage area, and wherein the post has a curved end portion substantially in the shape of an "L."

2. An overhead projector comprising:
   a) a main body having a stage area;
   b) an inverted head assembly;
   c) a post suspending the inverted head assembly over the stage area, wherein the post is pivotally attached to the main body such that the inverted head assembly does not to collide with the main body when pivotally rotated about the main body, wherein the post is outside the stage area when the overhead projector is in a display mode, wherein the post is positioned at the corner of the stage area and wherein the post has a curved end portion substantially in the shape of an "L."

\* \* \* \* \*

UNITED STATES PATENT AND TRADEMARK OFFICE
CERTIFICATE OF CORRECTION

PATENT NO. : 6,595,646 B2
DATED : July 22, 2003
INVENTOR(S) : Baldwin, Dwight G.

It is certified that error appears in the above-identified patent and that said Letters Patent is hereby corrected as shown below:

Column 2,
Line 37, delete "is that in that when" and insert in place thereof -- is that when --
Line 48, delete "cured" and insert in place thereof -- curved --

Column 4,
Line 11, delete "closet" and insert in place thereof -- closest --

Column 6,
Line 23, delete "not to collide" and insert in place thereof -- not collide --

Signed and Sealed this

Eighteenth Day of May, 2004

JON W. DUDAS
*Acting Director of the United States Patent and Trademark Office*